United States Patent
Novak (10) Patent No.: US 9,760,790 B2
(45) Date of Patent: Sep. 12, 2017

(54) CONTEXT-AWARE DISPLAY OF OBJECTS IN MIXED ENVIRONMENTS

(71) Applicant: Microsoft Technology Licensing, LLC, Redmond, WA (US)

(72) Inventor: Chris M. Novak, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/710,538

(22) Filed: May 12, 2015

(65) Prior Publication Data
US 2016/0335808 A1 Nov. 17, 2016

(51) Int. Cl.
*G06T 19/00* (2011.01)
*G06K 9/46* (2006.01)
*G06K 9/52* (2006.01)
*G06F 3/01* (2006.01)

(52) U.S. Cl.
CPC ............. *G06K 9/46* (2013.01); *G06F 3/011* (2013.01); *G06K 9/4671* (2013.01); *G06K 9/52* (2013.01); *G06T 19/006* (2013.01); *G06K 2009/4666* (2013.01)

(58) Field of Classification Search
None
See application file for complete search history.

(56) References Cited

U.S. PATENT DOCUMENTS

| 8,502,780 | B1 | 8/2013 | Park |
| 8,780,014 | B2 | 7/2014 | Border et al. |
| 8,868,039 | B2 | 10/2014 | Rodriguez |
| 8,947,322 | B1 | 2/2015 | Chi et al. |

(Continued)

FOREIGN PATENT DOCUMENTS

WO   WO2014021602   2/2014

OTHER PUBLICATIONS

Brian Benchoff, "Augmented Reality Ex Nihilo," http://hackaday.com/2011/12/28/augmented-reality-ex-nihilo/, Dec. 28, 2011.*

(Continued)

*Primary Examiner* — Nicholas R Wilson
(74) *Attorney, Agent, or Firm* — Scott Y. Shigeta; Jacob P. Rohwer; Newport IP, LLC (57) ABSTRACT

Concepts and technologies are described herein for providing a context-aware display of objects in mixed environments. The computing device displays an image on an interface. Data associated with at least one object is obtained from one or more resources, such as a camera, sensor and/or an external device. The obtained data is analyzed to determine if the object is of interest. Any number of factors, including a context associated with the object, may be used to determine if an object is of interest. The computing device modifies a display property, such as a transparency parameter, of a selected portion of the image, depending on obtained data and/or contextual data. Depending on the obtained data and/or contextual data, the computing device may display a visual indicator representing the object, an image of the object within the selected portion of the image, and/or any other object or indicator.

20 Claims, 7 Drawing Sheets

(56) References Cited

U.S. PATENT DOCUMENTS

| | | | |
|---|---|---|---|
| 2010/0241998 A1* | 9/2010 | Latta | G06F 3/011 715/862 |
| 2011/0304640 A1* | 12/2011 | Noge | G06T 19/006 345/589 |
| 2013/0044128 A1 | 2/2013 | Liu et al. | |
| 2013/0147686 A1 | 6/2013 | Clavin et al. | |
| 2013/0174213 A1 | 7/2013 | Liu et al. | |
| 2013/0194389 A1 | 8/2013 | Vaught et al. | |
| 2013/0286004 A1 | 10/2013 | McCulloch et al. | |
| 2013/0293688 A1 | 11/2013 | Benson et al. | |
| 2013/0321255 A1 | 12/2013 | Lamb et al. | |
| 2013/0335303 A1 | 12/2013 | Maciocci et al. | |
| 2013/0336629 A1 | 12/2013 | Mulholland et al. | |
| 2014/0160157 A1 | 6/2014 | Poulos et al. | |
| 2014/0357366 A1* | 12/2014 | Koganezawa | G06T 19/006 463/31 |
| 2015/0123966 A1* | 5/2015 | Newman | G06T 19/006 345/419 |
| 2015/0243079 A1* | 8/2015 | Cho | G02B 27/017 345/633 |

OTHER PUBLICATIONS

MathWorks, "Object Detection—MATLAB," https://www.mathworks.com/discovery/object-detection.html, Jan. 17, 2014.*

Steinicke et al., "Poster—A Virtual Body for Augmented Virtuality by Chroma-Keying of Egocentric Videos," IEEE, 2009.*

Han et al., "Individual Recognition Using Gait Energy Image" IEEE, 2006.*

Prince et al., "3D Live: Real Time Captured Content for Mixed Reality," 2002.*

Carter et al., "Recognising Human and Animal Movement by Symmetry," IEEE, 2001.*

Buchmann, et al., "Interaction with Partially Transparent Hands and Objects", in Proceedings of the Sixth Conference on User Interface, Jan. 30, 2005, 5 pages.

* cited by examiner

CONTEXT-AWARE DISPLAY OF OBJECTS IN MIXED ENVIRONMENTS

BACKGROUND

Some wearable computing devices, such as a head-mounted display (HMD), provide users with an immersive experience. For example, some HMDs are configured with a display positioned over a user's eyes. This configuration in conjunction with specialized software that dynamically changes a user's view depending on their head movement creates the ability for applications to provide a virtual reality experience or an augmented reality experience. Such devices enhance the overall user experience, which ultimately improves a device's entertainment and productivity capabilities.

Although such wearable computing devices are configured to provide a virtual reality experience or an augmented reality experience, a device that covers a user's eyes, even partially, may inhibit the user's ability to interact with other people, objects and devices. For example, if a user is wearing an HMD, it may be difficult for users to see a person approaching them. Often times, a user is required to remove the HMD to interact with another person. Such issues, and others, with current technologies may lead to socially awkward situations, cause a less than desirable user experience, or cause a device to become unusable.

It is with respect to these and other considerations that the disclosure made herein is presented.

SUMMARY

Concepts and technologies are described herein for providing a context-aware display of objects in mixed environments. In some configurations, an interface of a computing device can be configured to cover at least one eye of a user. During use, the computing device displays an image on the interface. The image may be generated by any platform or application, such as an operating system or virtual reality application. Data associated with at least one object is obtained from one or more resources, such as a camera, sensor and/or an external device. The obtained data is analyzed to determine if the object is of interest. Any number of factors, including a context associated with the object, may be used to determine if an object is of interest. For instance, an object may be of interest if the object is a person approaching the user of the computing device. If the object is of interest, the computing device can take one or more actions. For instance, the computing device can display a representation of the object within a selected portion of the image. In addition, the computing device can adjust one or more transparency values within the selected portion of the image to provide a view of the object through the interface.

In some configurations, depending on any obtained data and/or contextual data, the computing device may display a visual indicator to provide a notification associated with the object. Depending on a status of the object, such as a position of the object, the computing device may take one or more actions. In some configurations, the computing device may transition the display of the visual indicator into a display of a representation of the object. In another example, the computing device may transition the display of the visual indicator into a transparent section of the interface configured to provide a view of the object through the interface.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies are described herein for providing a context-aware display of objects in mixed environments. As summarized above, in some configurations, an interface of a computing device can be configured to cover at least one eye of a user. The computing device displays an image on the interface. The image may be generated by an application, such as a virtual reality application. Data associated with at least one object is obtained from one or more resources, such as a camera, sensor and/or any computing device. The obtained data is analyzed to determine if the object is of interest. Any number of factors, including a context associated with the object, may be used to determine if an object is of interest. For instance, an object may be of interest if the object is a person approaching the user of the computing device.

If it is determined that the object is of interest, the computing device can take one or more actions. For instance, among other actions, the computing device can display a representation of the object within a selected portion of the image. In some configurations, the computing device can adjust a transparency value within the selected portion of the image to provide a view of the object through the interface.

In some configurations, the size, position, and/or any display properties of the selected portion of the image may be based on one or more factors. For instance, a selected portion may be sized and positioned to display a video image of a person approaching the user of the computing device. In such an example, while the user of the computing device is viewing an image of a first environment, such as a rendering of a virtual world, the computing device may determine a size and position of a selected portion of the image to display a representation of the person approaching the user. In another example, the computing device may determine a size and position of a selected portion of the image to provide a viewing area with a controlled transparency that allows the user to view the object through the interface.

Techniques disclosed herein may also monitor input data to identify an event, status or changed circumstance. For instance, if a detected object moves in relation to the computing device, the position of the selected portion may be reshaped or moved to track the movement of the object. In another example, if a detected object is a person holding a device, the selected portion may change shape over time to provide a view of the device and the person. In addition, display properties, such as a transparency value or a contrast value, may be adjusted with varying levels of intensity at specified times depending on one or more factors and/or contextual information interpreted from any input data. For example, adjustments to the transparency of an interface may intensify as a person or object approaches the user wearing an HMD.

Depending on one or more factors, including a context associated with an object, the computing device may display a visual indicator to provide notification of one or more events. For example, depending on a status of the object, such as a position of the object, the computing device may take one or more actions. In one illustrative example, if the object is moving towards the computing device, configurations disclosed herein may display an icon indicating the presence and location of the object. The size and position of the visual indicator may be based on any data associated with the object, such as the position of the object.

In some configurations, the computing device may monitor the object and modify the visual indicator based on one or more events. For example, in the present example, as the object moves in relation to the computing device, the visual indicator may transition into a displayed representation of the object. In another example, by the adjustment of one or more transparency levels, the visual indicator may transition into a view of the object through the interface.

For illustrative purposes, configurations described herein provide both a "see through display" and an "augmented reality display." The "see through display," for example, may include a transparent lens that enables a user to see real-world objects through the lens while also displaying content on the lens. As will be described in more detail, the selected portions of the lens can have controllable transparency levels to provide a user with a "view" of real-world objects through the lens. For illustrative purposes, real-world objects are also referred to herein as "objects." In another example, the "augmented reality display" may include an opaque display that is configured to display content over a display of an image. The image may originate from any resource such as a video feed from a camera used to capture images of real-world objects. In other configurations, the image may be generated by an application. As will be described below, techniques herein controls content may be displayed over or within the image.

For illustrative purposes, a mixed environment may include the display of an image of a first environment and an image of a second environment. For example, an image of a first environment may include an image of a productivity application, a virtual reality application, or any other application. An image of a second environment may include an image of an object, such as a person. Configurations disclosed herein determine a context associated with at least one environment. For example, it may be determined that a detected object is a person walking in a particular direction. As summarized above, the context and other data may invoke one or more actions, such as the display of an image of a second environment over an image of the first environment. In the current example, configurations may display a representation of the person within a selected portion of the image of the first environment.

For illustrative purposes, a mixed environment may also include the display of an image of one environment while also providing a view of one or more objects through a selected portion of the image. As will be described in more detail, selected portions of the image and an interface, e.g., a lens, can be controlled by one or more transparency levels to provide a user with a view of their surrounding environment through the interface. With reference to the above-described example, depending on the detection of a particular context the techniques herein may adjustment one or more transparency levels to provide a view of the object through the interface.

The utilization of contextual information to cause one or more actions, such as selectivity displaying one environment within a selected portion of another environment, allows the computing device to alert the user of a particular scenario and/or enable a user to view their surroundings. For illustrative purposes, the selective display of one environment within a second environment is referred to herein as a "breakthrough" view. For example, when it is determined that an object is of interest, e.g., a person approaching the user of an HMD, a representation of the object or a view of the object may be displayed such that the object appears to breakthrough an image of an application, such as an image of a virtual world environment.

By providing a contextually-aware breakthrough view, techniques improve a user's interaction with a computing device and other objects. For instance, if a user is wearing an HMD, the techniques described herein enable the user to interact with other people or objects without the need to remove the HMD. The techniques described herein provide a user with one or more views of his or her surroundings, which may also mitigate socially awkward situations. In addition, depending on one or more factors, other actions, such as the adjustment of a volume level or the generation of a signal, e.g., a sound, may take place to assist the user in interacting with objects of interest.

As will be described in more detail below, in some configurations, the automatic display of objects in a mixed environment helps users understand their physical surroundings even when a display device impedes their eyesight. The techniques described herein may also alert the user of the computing device of one or more situations or events. For instance, as will be described in more detail below, contextual information may be generated from one or more inputs to determine that a hostile environment exists. For example, audio and video data may be interpreted to detect the presence of a fire or other hazardous situation. In addition, if a person is quickly approaching the user of the computing device, techniques described herein may identify a tone or mood associated with the person and alert the user accordingly. These techniques may increase the performance of the user and reduce user errors when interacting with the device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for providing a context-aware display of objects in mixed environments will be described.

Figure 1:
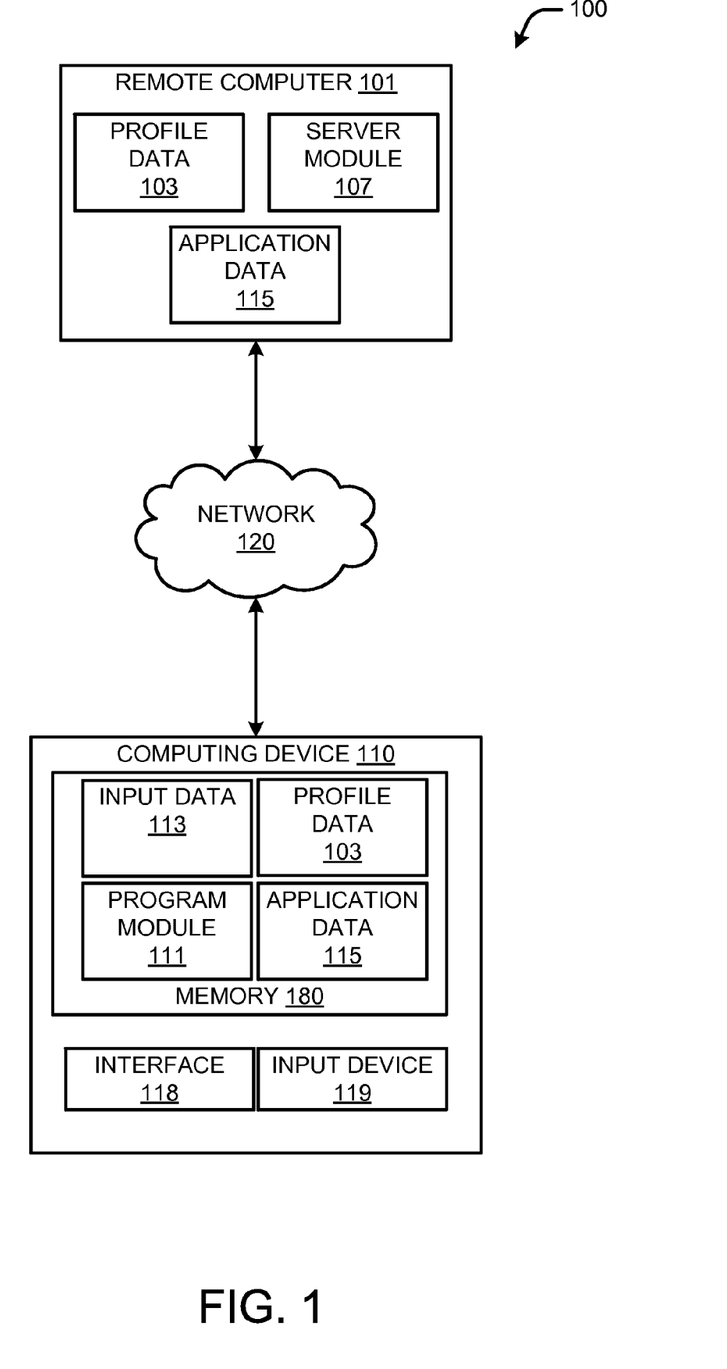
FIG. 1 is a block diagram showing several example components for providing a context-aware display of objects in mixed environments.

FIG. 1 is a system diagram showing aspects of one illustrative mechanism disclosed herein for providing a context-aware display of objects in mixed environments. As shown in FIG. 1, a system 100 may include a remote computer 101, a computing device 110 and a network 120. The computing device 110 may operate as a stand-alone device, or the computing device 110 may operate in conjunction with the remote computer 101. As can be appreciated, the remote computer 101 and the computing device 110 are interconnected through one or more local and/or wide area networks, such as the network 120. It should be appreciated that many more network connections may be utilized than illustrated in FIG. 1.

The computing device 110 may be in the form of a personal computer, a wearable computer, including a HMD, or any other device having components for causing a display of one or more images on a display, such as an interface 118. In some configurations, the interface 118 may be configured to cover at least one eye of a user. In one illustrative example, the interface 118 may include a screen configured to cover both eyes of a user. The system 100 may generate one or more images for generating a stereoscopic view of one or more objects.

The interface 118 may be configured to display multiple images from different environments. In addition, some configurations of the interface 118 may allow a user to see through the interface 118 enabling the user to view his or her surroundings. For illustrative purposes, the user's perspective looking through the interface 118 is referred to herein as a "real world view" or a "view" of an object or surrounding environment. As will be described in more detail below, content may be displayed around selected portions of the interface 118 enabling a user to see displayed content along with real world objects observed through the selected portions of an image or selected portions of the interface 118.

The computing device 110 may include a local memory 180 that stores profile data 103, input data 113, and application data 115, which may include an output generated by techniques disclosed herein. The profile data 103 may store information describing user activity, preferences and other information used for providing a context-aware display of objects in mixed environments. For instance, a user profile may indicate a preference for one or more techniques described herein. In such an example, a user preference may indicate that a breakthrough shall appear if an object is a person within 3 feet of the computing device 110. Such examples are provided for illustrative purposes and are not to be construed as limiting.

The computing device 110 may also include a program module 111 configured to manage techniques described herein and interactions between a user and the computing device 110. The program module 111 may be in the form of a game application, a virtual reality application, an operating system component or any other application configured to display image data, such as video data and/or image data, on a display. In one illustrative example, the program module 111 is a game application that creates or allows a user to interact with a virtual world environment or an augmented reality environment. In another illustrative example, the program module 111 may be in the form of an operating system component or a productivity application.

The remote computer 101 may be in the form of a server computer or a number of server computers configured to store and process the profile data 103, application data 115 and other information associated with the user and the related applications. As can be appreciated, the remote computer 101 may store duplicate copies of the profile data 103 and the application data 115 allowing a centralized service to coordinate a number of client computers, such as the computing device 110. The remote compute 101 may also include components such as the server module 107, for executing one or more techniques described herein. As will be described in more detail herein, the server module 107 may operate in conjunction with other modules, such as the program module 111, to implement aspects of the techniques disclosed herein.

Figure 2A:
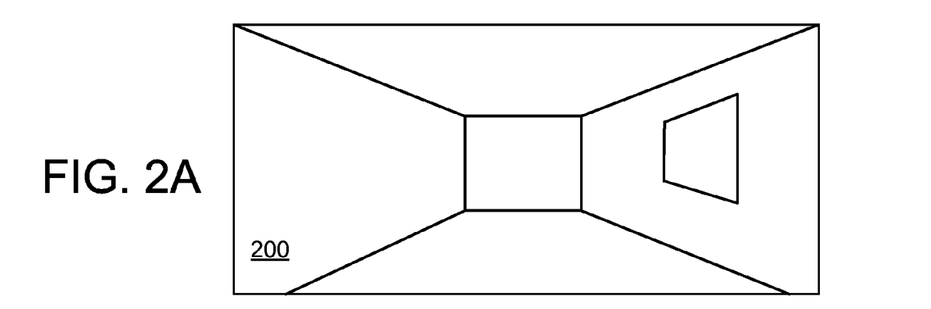
FIGS. 2A-2D illustrate example displays that may be generated to provide a view of an object in mixed environments.

In one illustrative example, during operation, the computing device 110 may display an image on an interface 118. The image may be generated by any module, program, or application such as a virtual reality application, productivity application, or operating system. The interface 118 can be configured to cover one or both eyes of a user to enhance the display of a virtual world environment. One example of an image that can be displayed on the interface 118 is shown in FIG. 2A.

By the use of at least one input device 119, such as a camera, microphone, keyboard or any other device, input data 113 associated with at least one object can be obtained. In one illustrative example, the input data 113 may include image data, such as video data captured from a camera. The input data 113 may also include other information, such as location information obtained from a Global Positioning System ("GPS"). These examples are provided for illustrative purposes only and are not to be construed as limiting.

The input data 113 may be analyzed to determine a context and/or generate contextual data. For example, techniques described herein may apply a facial recognition process to the input data 113. Any algorithm or technology that can analyze characteristics of an object, such as a shape, movement patterns, and sound patterns, may also be utilized to determine a context and/or generate contextual data.

The input data 113 and any generated contextual data can be analyzed to determine if the object is of interest. Techniques for determining if an object is of interest may depend on one or more factors. For instance, an object may be of interest if the object is at a predetermined distance from the computing device 110. In one illustrative example, the object may be a person approaching the user of the computing device 110. If the person, for example, approaches the computing device with respect to a threshold, the system 100 may determine that the object is of interest.

In other illustrative examples, a position and a direction associated with one or more objects may also be used to determine if an object is of interest. In addition, sound and image data analysis techniques may also be analyzed to determine a context. For example, if two people approach the user of the computing device 110, input data 113 may be analyzed to determine that one object is a person directing speech to the user of the computing device 110. The analysis of the input data 113 may also indicate that the other person is walking away from the user of the computing device 110. In such an example scenario, the program module 111 may determine that the person directing speech to the user is of interest and the other person walking away from the user is not of interest. Such configurations enable the system 100 to selectively display objects or provide a view of objects that are most likely to be of interest to the user.

In some configurations, any suitable technology may be used, such as a face recognition technology, to determine an object type, e.g., if an object is a person, animal, or otherwise. In addition, such technologies may be used to identify a particular identity of a user. Identity data or data indicating an object type may be used by techniques disclosed herein to modify access rights, a display setting and/or cause a display or a representation of one or more objects.

Any number of factors may be used to determine if an object is of interest. For instance, techniques disclosed herein may distinguish a person directing speech away from the computing device 110 from a person directing speech toward the computing device 110. In other examples, techniques disclosed herein may identify the presence of a device, such as a mobile phone. The identification of a device may be based on the size and shape of the device or other data received from the device or a service.

In other scenarios, audio data may be analyzed to determine a context with respect to speech data that is obtained by the computing device 110. For example, inflection points, accents, or other distinguishing characteristics may be analyzed to determine if an object is of interest. In yet another example, if input data 113 includes speech data, a context derived from an interpretation of speech data may be used to determine if an object is of interest.

If the program module 111 determines that an object is of interest, one or more actions may occur. In some configurations, the techniques disclosed herein may adjust display properties of the interface 118 and/or control the display of the object based on the input data 113. In one illustrative example, the computing device 110 can display a representation of the object within a selected portion of a displayed image. In another illustrative example, the computing device 110 can adjust a transparency value within the selected portion of a displayed image to provide a view of the object through the interface 118. FIGS. 2A-2D, 3A-3H and 4A-4D illustrate some examples of adjustments and/or displays that may be invoked if it is determined that an object is of interest.

Referring now to FIG. 2A, aspects of an illustrative example is shown and described. As summarized herein, techniques disclosed herein may include displaying, at the computing device 110, an image 200 on an interface 118. As also summarized herein, the displayed image may be generated by any module, program, or application such as a virtual reality application, productivity application, or operating system. The example illustrated in FIG. 2A includes an image 200 of a virtual reality environment. For illustrative purposes, the virtual reality environment is also referred to herein as the "first environment." As shown, in this example, one rendering of the virtual reality environment includes a room with a window.

Figure 2B:
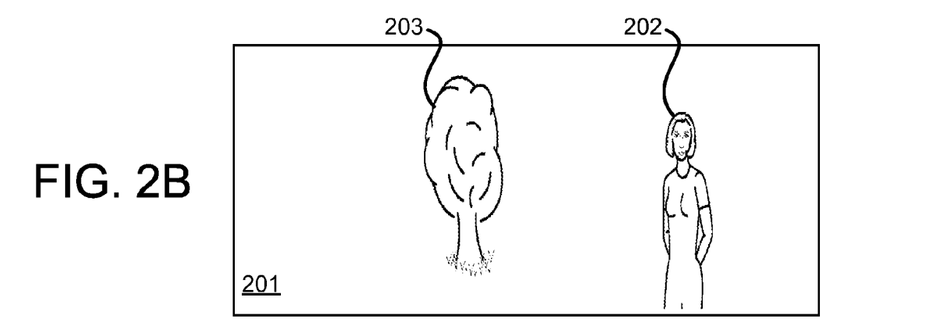

As also described above, techniques disclosed herein may include obtaining input data 103 associated with at least one object. The input data 103 may be in the form of video data, image data, audio data or any other type of data received from any device or resource, such as a camera, microphone, sensor or any other input device. To illustrate aspects of the present example, it is a given that the input data 103 is from a video camera mounted to the front of an HMD. FIG. 2B illustrates an example rendering 201 of input data 103 given this scenario. In this example, a rendering 201 includes two objects: a person 202 and a tree 203. For illustrative purposes, the person 202 and the tree 203 are respectively referred to herein as a first object and second object.

As also summarized above, the computing device 110 may process the input data 103 to determine if an object is of interest. In some configurations, the input data 103 may be analyzed to determine a context. Any type of analysis may be performed on the input data 103 to determine a context. For instance, facial recognition algorithms may be utilized to determine an identity or other contextual information regarding a person or object. Any suitable techniques for identifying humans, animals and other objects may be utilized. In some technologies, facial recognition technologies may also determine a mood or expression. Such contextual information may be utilized to determine if an object is of interest.

In the present example, it is a given that the user of the computing device 110 is facing the tree 203 and the person 202. Given such a scenario, techniques disclosed herein may analyze the input data 103 to determine if one or more objects are of interest. Depending on any number of factors, such a configuration setting or user preference, configurations disclosed herein may determine if one or more objects are of interest. For example, a user preference may indicate that an object is of interest if the object is a person approaching the user of the computing device 110.

In applying this example user preference to the example of FIG. 2B, the computing device 110 may determine that the person 202 is of interest, and that the tree 203 is not of interest. As summarized above, when the system 100 determines that an object is of interest, one or more actions may be taken. For example, when the system 100 determines that an object is of interest, some configurations may utilize the context to selectivity display aspects of one environment within a selected portion of another environment.

Figure 2C:
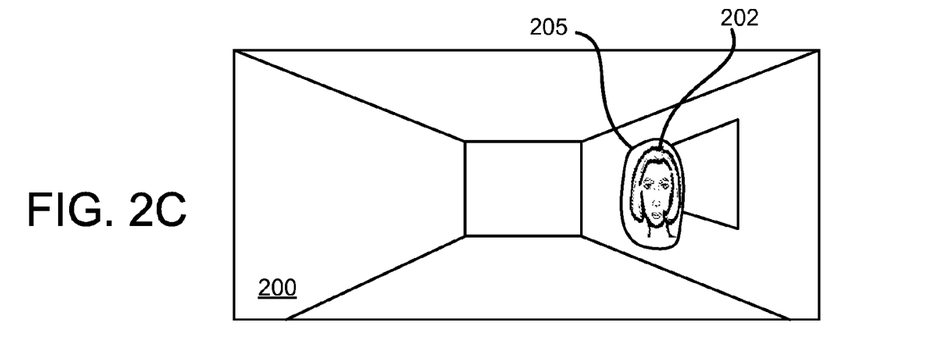

FIG. 2C depicts one illustrative example of one possible output that may be generated when one or more objects are found to be of interest. In the current example, since the person 202 is of interest, techniques disclosed herein determine the size and position of a selected portion 205 of the image 200. The selected portion 205 is configured to provide a view the object or a rendering of the object. As shown in FIG. 2C, the selected portion 205 is sized and positioned to display at least a portion of the person 202.

The size, position and/or other properties associated with the selected portion 205 may be based on one or more factors and/or a context. In some configurations, the selected portion 205 can be sized to accommodate the display of salient features of the object of interest. In the example shown in FIG. 2C, the size and position of the selected portion 205 may be configured to accommodate a display of the face of the person 202. Such configurations, may be desired to facilitate interaction between the user of the computing device 110 and other people, such as the person 202.

In some configurations, the size, position and other properties associated with the selected portion 205 may change over time depending on one or more factors. For instance, the size of the selected portion 205 may increase or decrease depending on one or more factors, such as the distance between the object, e.g., the person 202, and the computing device 110. In addition, the position of the selected portion 205 may change to track any movement of the person 202 or other objects. In one illustrative example, one or more gradients may be integrated with the techniques disclosed herein. In some configurations, the selected portion 205 may have one or more components with variable attributes. In such configurations, one or more attributes, e.g., a transparency value of an edge of the selected portion 205, may gradually change over a distance, e.g., 5 mm, instead of having an abrupt step.

Figure 2D:
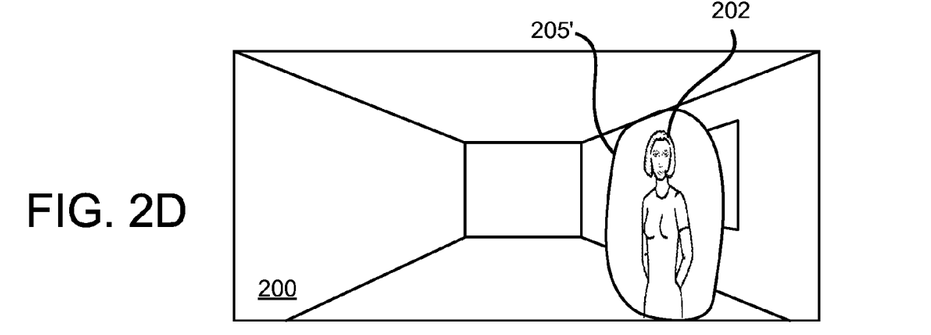

The example shown in FIG. 2D illustrates one example where the selected portion 205 is sized to display a broad view of the person 202. This view may be generated to accommodate one or more scenarios, such as the position of the person 202 relative to the computing device 110. Such a configuration may determine that the selected portion 205 (FIG. 2C) have a first size if the object is at a first distance from the computing device 110, and such a configuration may determine that the selected portion 205' (FIG. 2D) have a second size if the object is at a second distance from the computing device 110. Such an example is provided for illustrative purposes and is not to be construed as limiting.

Other types of analysis may be applied to the input data 103 to determine a priority of the object. For instance, the priority of an object may increase if the object is a person 202 is speaking directly to the user of the computing device 110. In such an example, the priority associated with the object may decrease if the person 202 stops speaking. A determined priority may cause one or more actions, such as an adjustment to the size and position of the selected portion, an adjustment of a contrast value, or any other adjustment to an application or setting. For example, as shown in FIG. 2D, the size of the selected portion 205 may increase as the person 202 moves toward the computing device 110.

As can be appreciated, the size and configuration of the selected portion 205 may be based on any data from any resource. For instance, a device, such as a mobile phone, carried by the person 202 may provide location information or any other information shared via a social network or any other resource. These examples are provided for illustrative purposes only and are not to be construed as limiting.

In other examples, an object may be of interest if one or more conditions are met. For instance, the computing device 110 may be configured to determine that an object is of interest if the object is a person and the person is speaking at a high volume. In another example, the computing device 110 may be configured to determine that multiple objects are of interest. For example, one of the object is a person and a second object is a device held by the person, based on one or more settings or preferences, configurations may determine that both the person and the device are of interest. In addition, any context derived from input data 103 may be used to determine a priority with respect to each object. For instance, if a detected object is a mobile phone held by a person, the priority of the mobile phone maybe higher than the person. Such a configuration may be desirable if the user wants to read content on the mobile phone.

FIGS. 3A-3G illustrate other examples where configurations may accommodate a view or rendering of multiple devices. To illustrate such configurations, consider a scenario where the input data 103 is a video feed of the first person 202 and a second person 301. An example rendering 201 of such input data 103 is provided in FIG. 3A. Techniques and technologies disclosed herein may selectively display the first person 202 or the second person 301 depending on a context interpreted from the input data 103.

Figure 3A:
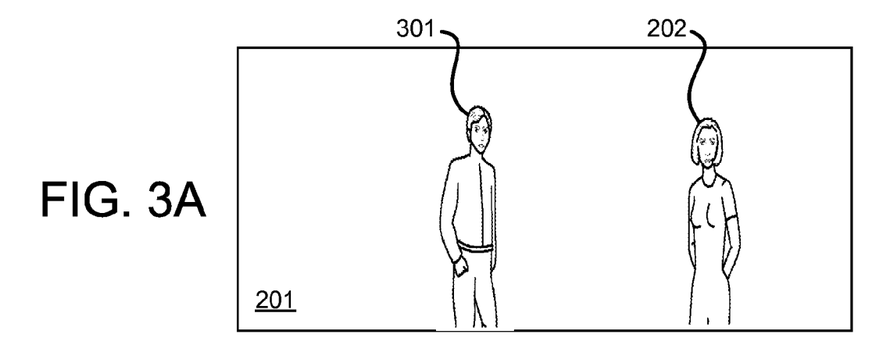
FIGS. 3A-3G illustrate example displays that may be generated to provide a view of multiple objects in mixed environments.
Figure 3B:
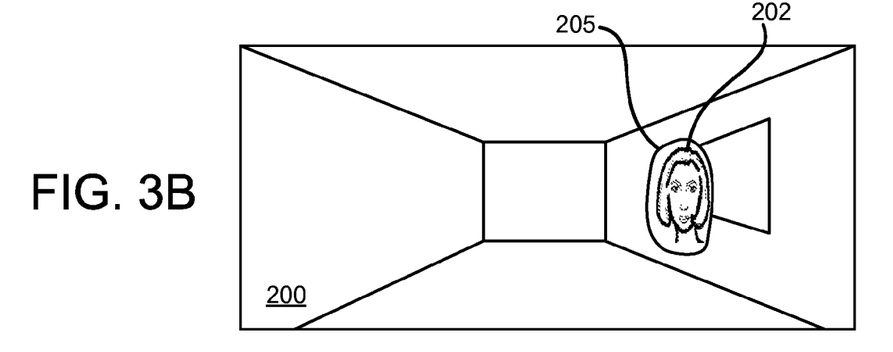

For instance, techniques disclosed herein may display a breakthrough view of the first person 202 if the first person 202 is speaking. An example rendering of such a scenario is shown in FIG. 3B.

Figure 3C:
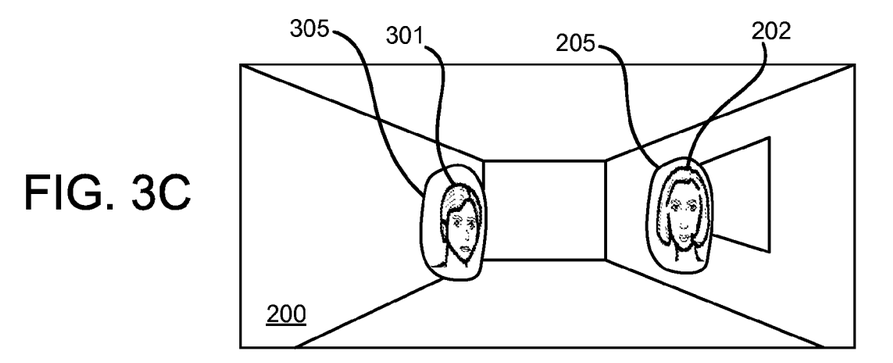

In addition, techniques disclosed herein may display a breakthrough view of the first person 202 and a breakthrough view of the second person 301 if the first person 202 and the second person 301 are both speaking. An example rendering of such a scenario is shown in FIG. 3C. As shown, a rending or view of the second person 301 may be shown in a second selected portion 305 along with a rending or view of the first person 202. These examples are provided for illustrative purposes and are not to be construed as limiting. Any gesture or action by the user or any input data 103 may be used to control the display of images from multiple environments.

Figure 3D:
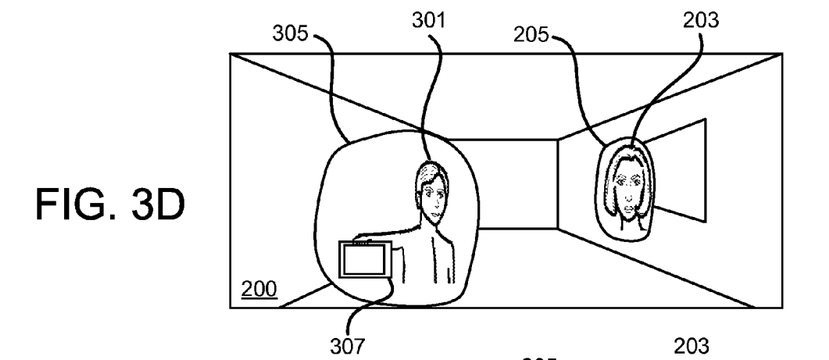
Figure 3E:
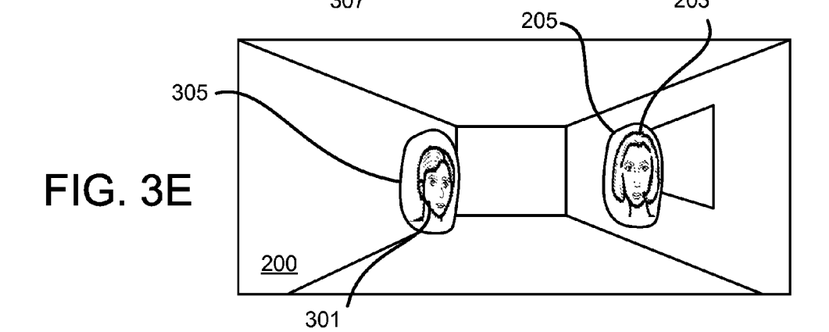
Figure 3F:
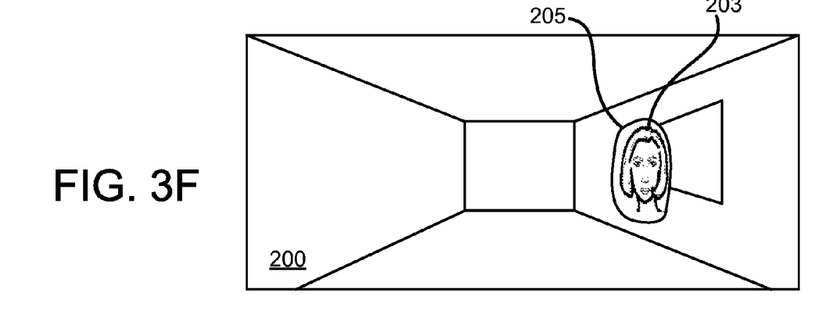
Figure 3G:
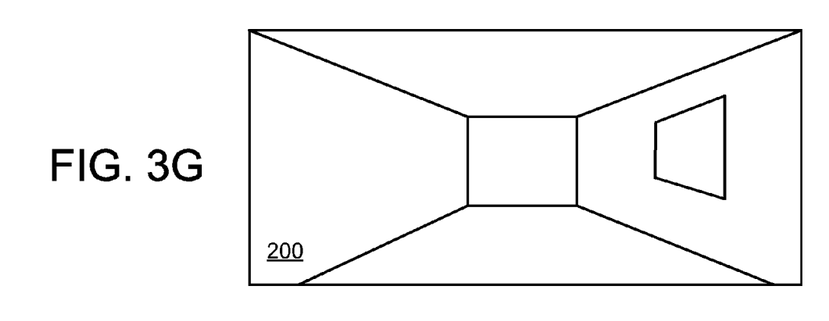

FIG. 3D is a further extension of the example illustrated in FIG. 3C. In this example, the second person 301 is holding a tablet 307. When such a scenario is presented, based on a context that is interpreted from input data 103, the second selected portion 305 may be adjusted to accommodate a view or a display of the second person 301 and the tablet 307. As shown in FIGS. 3B-3G, the display of the mixed environments may be controlled dynamically depending on the context interpreted from the input data 103. In this illustrative example, an output of the computing device 110 may transition from the example of FIG. 3E to the example of FIG. 3F if the second person 301 stops speaking. Similarly, an output of the computing device 110 may transition from the example of FIG. 3F to the example of FIG. 3G if the first person 202 stops speaking and no objects are determined to be of interest.

In addition to the generation of image data, the computing device 110 may also be configured to provide one or more alarms and/or visual indicators to indicate the presence of an object. For instance, if a person approaches the user of the computing device 110, the computing device 110 may generate a visual indicator and/or provide one or more alarms to indicate the presence of an object.

FIGS. 4A-4D illustrate one example configuration where a visual indicator may be displayed. To illustrate this example, consider a scenario where a person approaches the user of the computing device 110 from the user's side. In such a scenario, the person may not be in a position to allow the computing device 110 to display a rendering of the person or a provide a view of the person. In such scenarios, or when any other pre-determined condition is detected, techniques disclosed herein may display a visual indicator. In one illustrative example, the example rendering of FIG. 4A may transition into the example rending of FIG. 4B, which shows an example of a visual indicator 401.

Figure 4A:
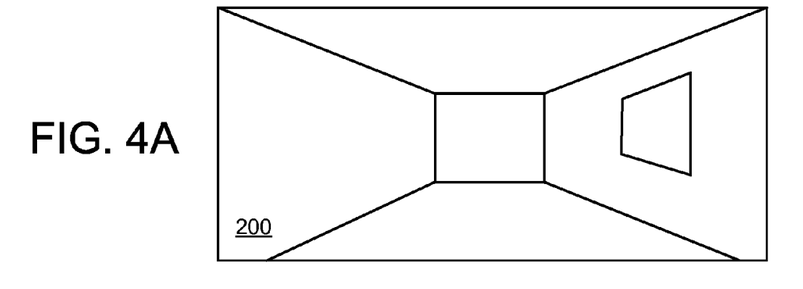
FIGS. 4A-4D illustrate example displays that may be generated to provide a display of a visual indicator and a view at least one object.
Figure 4B:
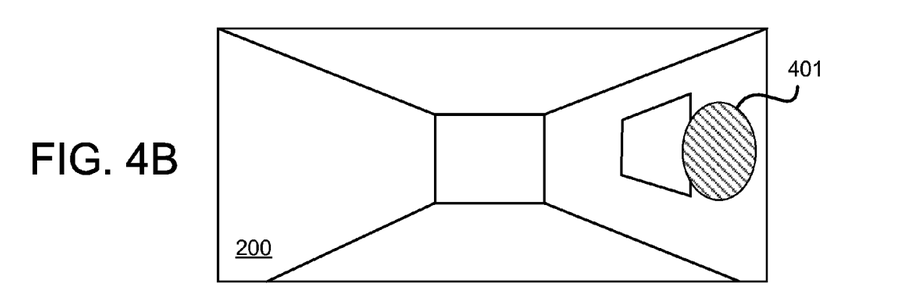
Figure 4C:
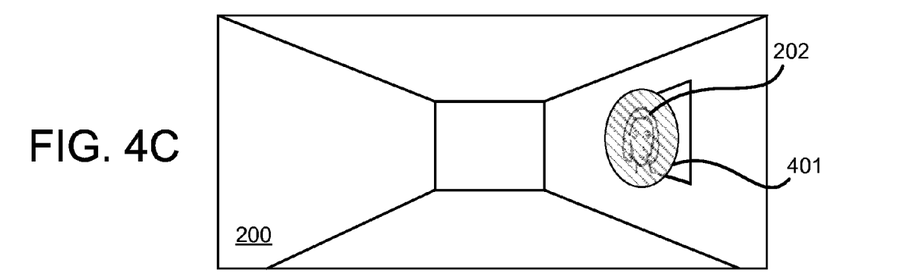
Figure 4D:
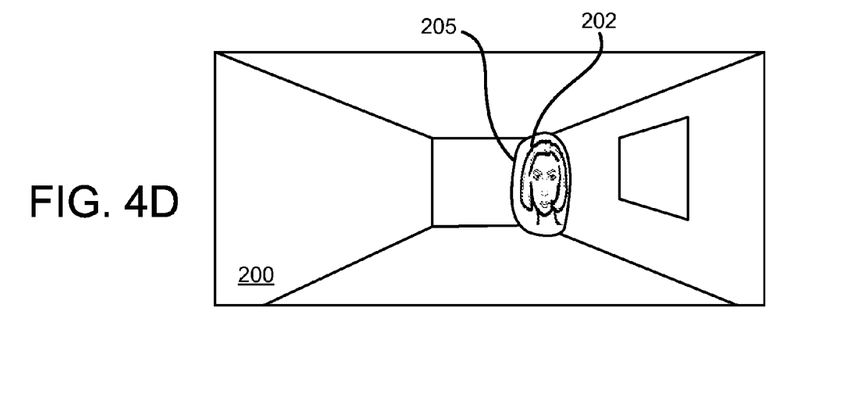

Depending on the context interpreted from the input data 103, configurations disclosed herein may manipulate or modify the display of the visual indicator. For example, if the context interpreted from the input data 103 indicates that the object has met one or more conditions, i.e. moved to a particular position, one or more actions may be invoked. In one illustrative example, if a detected object is a person walking around the user of the computing device 110, techniques disclosed herein transition the display of the visual indicator 401 and into a rendering or view of the person 202. An example of such a transition is shown in FIG. 4C in FIG. 4D. In another example, the context interpreted from the input data 103 may also be used to identify an object type or a status related to the object. For instance, if the context interpreted from the input data 103 identifies a person, the visual indicator may be rendered in a particular color or displayed with other descriptive information.

These examples are provided for illustrative purposes and are not to be construed as limiting. Further, some examples disclosed herein describe an overlay of content over an image, a configuration that may be used in an "augmented reality display." In addition, some examples disclosed herein describe techniques that overlay content over a "see through display" enabling a user to see a real world view. It can be appreciated that techniques described herein may apply to a "see through display," an "augmented reality display" or any other environment or arrangement.

Figure 5:
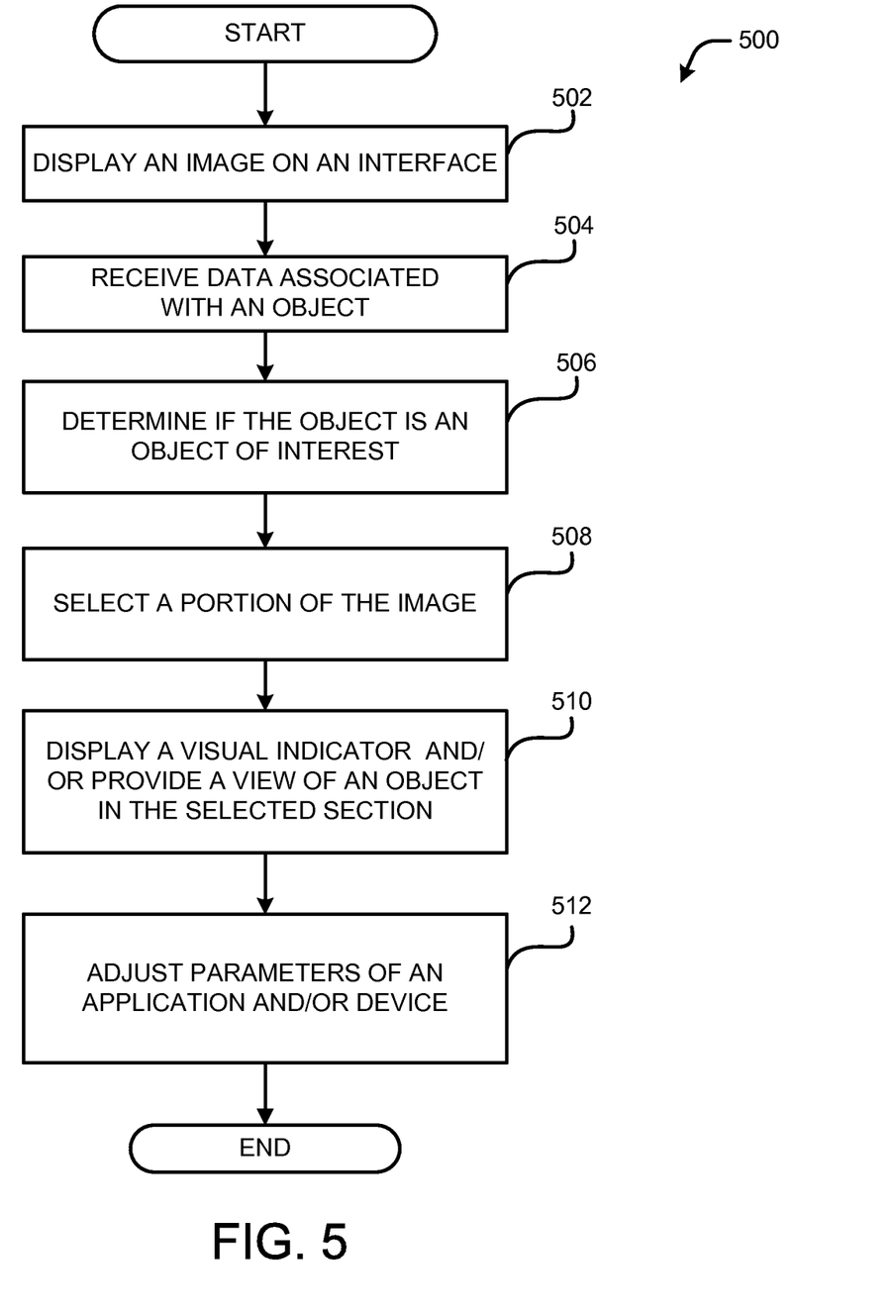
FIG. 5 is a flow diagram of one example routine that may be used for providing a context-aware display of objects in mixed environments.

Turning now to FIG. 5, aspects of a routine 500 for providing a context-aware display of objects in mixed environments are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIG. 1, the operations of the routine 500 are described herein as being implemented, at least in part, by an application, component and/or circuit, such as the program module 111 and/or the server module 107. Although the following illustration refers to the components of FIG. 1, it can be appreciated that the operations of the routine 500 may be also implemented in many other ways. For example, the routine 500 may be implemented, at least in part, by computer processor or processor of another computer. In addition, one or more of the operations of the routine 500 may alternatively or additionally be implemented, at least in part, by a chipset working alone or in conjunction with other software modules. Any service, circuit or application suitable for providing contextual data indicating the position or state of any device may be used in operations described herein.

With reference to FIG. 5, the routine 500 begins at operation 502, where the program module 111 displays an image 200 on an interface 118. The image 200 may include a rendering from any module, program, or application such as a virtual reality application, productivity application, or operating system. An example of the image 200 is illustrated in FIG. 2A. Although virtual world reality examples are provided herein, the image 200 displayed at operation 502 may include any type of image, which may be a user interface for a productivity application, simulator or any other application.

Next, at operation 504, the program module 111 may receive input data 103 associated with one or more objects. As summarized above, the input data 103 may be in the form of video data, image data, audio data or any other type of data received from any device or resource, such as a camera, microphone or any other input device. The input data 103 may also be in the form of skeletal data, geometric data or any other data such as audio data.

Next, at operation 508, the program module 111 may process the input data 103 to determine if there is at least one object of interest. As summarized above, the input data 103 may be analyzed to determine a context. A number of different types of analysis may be performed on the input data 103 to determine a context. For instance, facial recognition algorithms may be utilized to determine an identity or other contextual information regarding a person or object. Currently known techniques for identifying humans, animals and other objects may be utilized. In some technologies, facial recognition technologies may also determine a mood or expression. Contextual or any input data 103 may be utilized to determine if an object is of interest.

Next, at operation 508, the program module 111 may select a portion of the image. As described above, a selected portion of the image may be used to display images or other visual indicators. The size, position and/or other properties associated with the selected portion 205 may be based on one or more factors and/or a context. In some configurations, the selected portion 205 is sized to accommodate the display of salient features of an object of interest. As described above, known algorithms for deriving a context from input data 103 may be used to determine the size, position and other properties associated with the selected portion 205. In addition, a priority may be determined with respect to an object, and such a parameter may be used to determine the size, position and other properties associated with the selected portion 205.

Next, at operation 510, the program module 111 may display a visual indicator, display a rendering or view of an object in a selected portion of the image 200. As summarized above, detection of one or more scenarios may cause the program module 111 to take one or more actions. As described in the example of FIG. 4B, instead of, or in addition to, rendering an image of an object, techniques disclosed herein may display a visual indicator. Such configurations, may provide notice of one or more events, such as a person approaching the user. Operation 510 may also enable the user of the computing device to view an object by adjusting the transparency of an image or interface. In addition, operation 510 may also provide a view of an object or a display a rendering of the object, such as the example shown in FIG. 4D.

Next, at operation 512, the program module 111 may adjust parameters of an application or device. For example, if the program module 111 determines that an object is of interest, the program module 111 may mute any audio signal or adjust the contrast or brightness of a displayed image. Other actions include the generation of an alarm signal, a transition from one audio source to another audio source, etc. Operation 512 may involve any action or instruction to facilitate the user's interaction with objects of interest.

Figure 6:
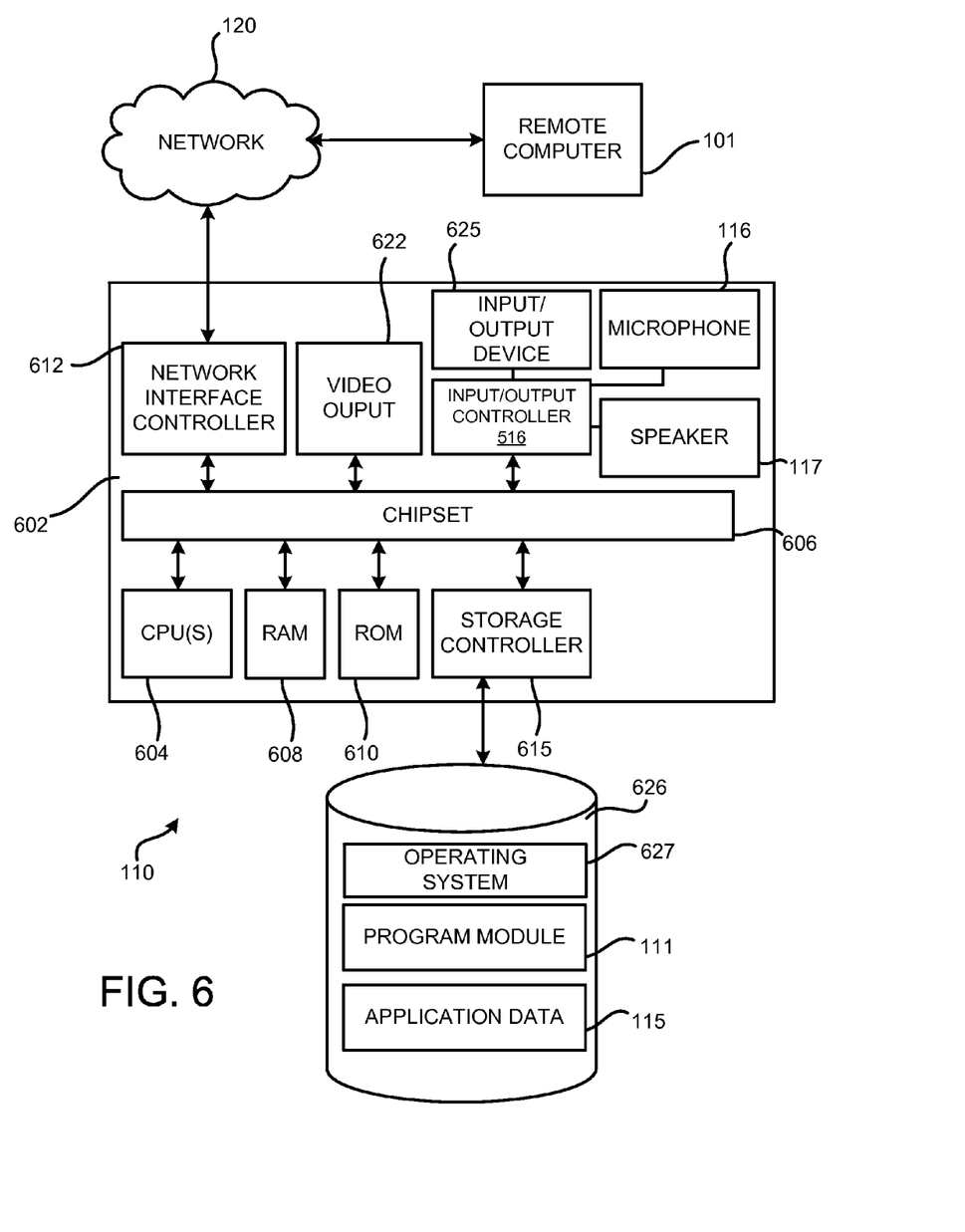
FIG. 6 is a computer architecture diagram showing an illustrative computer hardware and software architecture for a computing device capable of implementing aspects of the configurations presented herein.

FIG. 6 shows additional details of an example computer architecture for the components shown in FIG. 1 capable of executing the program components described above for providing a context-aware display of objects in mixed environments. The computer architecture shown in FIG. 6 illustrates a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 6 may be utilized to execute any of the software components described above. Although some of the components described herein are specific to the computing device 110, it can be appreciated that such components, and other components may be part of the remote computer 101.

The computing device 110 includes a baseboard 602, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 may be standard programmable processors that perform arithmetic and logical operations necessary for the operation of the computing device 110.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computing device 110. The chipset 606 may further provide an interface to a computer-readable storage medium such as a read-only memory ("ROM") 610 or non-volatile RAM ("NVRAM") for storing basic routines that help to startup the computing device 110 and to transfer information between the various components and devices. The ROM 610 or NVRAM may also store other software components necessary for the operation of the computing device 110 in accordance with the embodiments described herein.

The computing device 110 may operate in a networked environment using logical connections to remote computing devices and computer systems through a network, such as the local area network 120. The chipset 606 may include functionality for providing network connectivity through a network interface controller (NIC) 612, such as a gigabit Ethernet adapter. The NIC 612 is capable of connecting the computing device 110 to other computing devices over the network 120. It should be appreciated that multiple NICs 612 may be present in the computing device 110, connecting the computer to other types of networks and remote computer systems. The network 120 allows the computing device 110 to communicate with remote services and servers, such as the remote computer 101. As can be appreciated, the remote computer 101 may host a number of services such as the XBOX LIVE gaming service provided by MICROSOFT CORPORATION of Redmond Wash. In addition, as described above, the remote computer 101 may mirror and reflect data stored on the computing device 110 and host services that may provide data or processing for the techniques described herein.

The computing device 110 may be connected to a mass storage device 626 that provides non-volatile storage for the computing device. The mass storage device 626 may store system programs, application programs, other program modules, and data, which have been described in greater detail herein. The mass storage device 626 may be connected to the computing device 110 through a storage controller 615 connected to the chipset 606. The mass storage device 626 may consist of one or more physical storage units. The storage controller 615 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 626, other storage media and the storage controller 615 may include MultiMediaCard (MMC) components, eMMC components, Secure Digital (SD) components, PCI Express components, or the like.

The computing device 110 may store data on the mass storage device 626 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 626 is characterized as primary or secondary storage, and the like.

For example, the computing device 110 may store information to the mass storage device 626 by issuing instructions through the storage controller 615 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 110 may further read information from the mass storage device 626 by detecting the physical states or characteristics of one or more particular locations within the physical storage units.

In addition to the mass storage device 626 described above, the computing device 110 may have access to other computer-readable media to store and retrieve information, such as program modules, data structures, or other data. Thus, although the program module 111, application data 115 and other modules are depicted as data and software stored in the mass storage device 626, it should be appreciated that these components and/or other modules may be stored, at least in part, in other computer-readable storage media of the computing device 110. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computing device 110.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 110. For purposes of the claims, the phrase "computer storage medium," and variations thereof, does not include waves or signals per se and/or communication media.

The mass storage device 626 may store an operating system 627 utilized to control the operation of the computing device 110. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 626 may store other system or application programs and data utilized by the computing device 110, such as the program module 111, application data 115 and/or any of the other software components and data described above. The mass storage device 626 might also store other programs and data not specifically identified herein.

In one embodiment, the mass storage device 626 or other computer-readable storage media is encoded with computer-executable instructions which, when loaded into the computing device 110, transform the computer from a general-purpose computing system into a special-purpose computer capable of implementing the embodiments described herein. These computer-executable instructions transform the computing device 110 by specifying how the CPUs 604 transition between states, as described above. According to one embodiment, the computing device 110 has access to computer-readable storage media storing computer-executable instructions which, when executed by the computing device 110, perform the various routines described above with regard to FIG. 5 and the other figures. The computing device 110 might also include computer-readable storage media for performing any of the other computer-implemented operations described herein.

The computing device 110 may also include one or more input/output controllers 616 for receiving and processing input from a number of input devices, such as a keyboard, a mouse, a microphone, a headset, a touchpad, a touch screen, an electronic stylus, or any other type of input device. Also shown, the input/output controllers 616 is in communication with an input/output device 625. The input/output controller 616 may provide output to a display, such as a computer monitor, a flat-panel display, a digital projector, a printer, a plotter, or other type of output device. The input/output controller 616 may provide input communication with other devices such as a microphone 116, a speaker 117, game controllers and/or audio devices. In addition, or alternatively, a video output 622 may be in communication with the chipset 606 and operate independent of the input/output controllers 616. It will be appreciated that the computing device 110 may not include all of the components shown in FIG. 6, may include other components that are not explicitly shown in FIG. 6, or may utilize an architecture completely different than that shown in FIG. 6.

The disclosure presented herein may be considered in view of the following clauses.

Clause 1: A example, comprising: comprising displaying, at a computing device, an image on an interface; obtaining data associated with at least one object; determining if the object is of interest; and if it is determined that the object is of interest, displaying a representation of the object within a selected portion of the image, or adjusting a transparency value that controls a view of the object through the interface, wherein the view of the object through the interface is within the selected portion of the image.

Clause 2: The example of clause 1, further comprising obtaining contextual information related to the object; and determining a position of the selected portion of the image based on, at least in part, the contextual information.

Clause 3: The example of clauses 1-2, further comprising: obtaining contextual information related to the object; and determining a size of the selected portion based on, at least in part, the contextual information.

Clause 4: The example of clauses 1-3, further comprising: obtaining contextual information related to the object, wherein the contextual information comprises location information associated with the object; determining if the location information indicates that a location of the object is within a threshold relative to the location of the computing device; and displaying a visual indicator, wherein the visual indicator is generated as an overlay on the image, and transitioning the display of the visual indicator into the display of the representation of the object, or transitioning the display of the visual indicator to the view of the object through the interface.

Clause 5: The example of clauses 1-4, wherein transitioning the display of the visual indicator to the display of the representation or transitioning the display of the visual indicator to the view are based, at least in part, on the location of the object relative to the computing device.

Clause 6: The example of clauses 1-5, further comprising modifying a status of an application controlling the image, if it is determined that the object is of interest.

Clause 7: The example of clauses 1-6, wherein modifying the status of the application includes reducing a volume control associated with the application or pausing one or more processes of the application.

Clause 8: A computing device, comprising: a processor; a memory having computer-executable instructions stored thereupon which, when executed by a computing device, cause the computing device to display an image on an interface; obtain data associated with at least one object; determine if the object is of interest; and display a representation of the object within a selected portion of the image, if it is determined that the object is of interest.

Clause 9: The computer of clause 8, wherein the memory has further computer-executable instructions, which cause the computing device to: obtain contextual information related to the object; and determine a position of the selected portion of the image based on, at least in part, the contextual information.

Clause 10: The computer of clauses 8-9, wherein the memory has further computer-executable instructions, which cause the computing device to: obtain contextual information related to the object; and determine a size of the selected portion of the image based on, at least in part, the contextual information.

Clause 11: The computer of clauses 8-10, herein the memory has further computer-executable instructions, which cause the computing device to: obtain contextual information related to the object, wherein the contextual information comprises location information associated with the object; determine if the location information indicates that a location of the object is within a threshold relative to the location of the computing device; display a visual indicator, wherein the visual indicator is generated as an overlay on the image; and transition the display of the visual indicator into the display of the representation of the object.

Clause 12: The computer of clauses 8-11, wherein transitioning the display of the visual indicator into the display of the representation is based on, at least in part, the location of the object relative to the computing device.

Clause 13: The computer of clauses 8-12, wherein the memory has further computer-executable instructions, which cause the computing device to modify a status of an application controlling the image, if it is determined that the object is of interest.

Clause 14: The computer of clauses 8-13, wherein modifying the status of the application includes reducing a volume control associated with the application or pausing one or more processes of the application.

Clause 15: A computer storage medium having computer-executable instructions stored thereupon which, when executed by a computing device, cause the computing device to: display, at the computing device, an image on an interface; obtain data associated with at least one object; determine if the object is of interest; and if it is determined that the object is of interest, adjust a transparency value that controls a view of the object through the interface, wherein the view of the object through the interface is within a selected portion of the image.

Clause 16: The computer-readable storage medium of clause 15, wherein the computer storage medium has further computer-executable instructions, which cause the computing device to: obtain contextual information related to the object; and determine a position of the selected portion of the image based on, at least in part, the contextual information.

Clause 17: The computer-readable storage medium of clauses 15-16, wherein the computer storage medium has further computer-executable instructions, which cause the computing device to: obtain contextual information related to the object; and determine a size of the selected portion of the image based on, at least in part, the contextual information.

Clause 18: The computer-readable storage medium of clauses 15-17, wherein the computer storage medium has further computer-executable instructions, which cause the computing device to: obtain contextual information related to the object, wherein the contextual information comprises location information associated with the object; determine if the location information indicates that a location of the object is within a threshold relative to the location of the computing device; display a visual indicator, wherein the visual indicator is generated as an overlay on the image; and transition the display of the visual indicator into the view of the object through the interface.

Clause 19: The computer-readable storage medium of clauses 15-17, wherein transitioning the display of the visual indicator into the display of the representation is based on, at least in part, the location of the object relative to the computing device.

Clause 20: The computer-readable storage medium of clauses 15-19, wherein the computer storage medium has further computer-executable instructions, which cause the computing device to modify a status of an application controlling the image, if it is determined that the object is of interest.

Based on the foregoing, it should be appreciated that technologies for providing a context-aware display of objects in mixed environments are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method, comprising:
displaying, at a computing device, an image on an interface;
obtaining data associated with an object, wherein the data comprises location data and shape data;
determining, based at least in part on the shape data, a type of the object;
determining, based at least in part on the location data, that the object is moving relative to a location of the computing device;
determining that the object is emitting a sound;
determining that the object is of interest based at least in part on the determining that the object is moving relative to the location of the computing device and the determining that the object is emitting the sound;
in response to the determining that the object is of interest, displaying a visual indicator, wherein the visual indicator is generated as an overlay on the image and the visual indicator represents the type of the object;

determining that the location data indicates that a location of the object is within a threshold relative to the location of the computing device; and in response to the determining that the location data indicates that the location of the object is within the threshold relative to the location of the computing device, transitioning the display of the visual indicator into a view of the object within a selected portion of the image.

2. The method of claim 1, further comprising:
obtaining contextual information related to the object; and
determining a position of the selected portion of the image based on, at least in part, the contextual information.

3. The method of claim 1, further comprising:
obtaining contextual information related to the object; and
determining a size of the selected portion of the image based on, at least in part, the contextual information.

4. The method of claim 1, wherein the object comprises a human and the sound comprises speech.

5. The method of claim 1, wherein the transitioning the display of the visual indicator into the view of the object through the interface is based, at least in part, on the location of the object relative to the location of the computing device.

6. The method of claim 1, further comprising modifying a status of an application controlling the image based at least in part on the determining that the object is of interest.

7. The method of claim 6, wherein the modifying the status of the application includes at least one of reducing a volume control associated with the application or pausing one or more processes of the application.

8. A computing device, comprising:
a processor; and
a memory having computer-executable instructions stored thereupon which, when executed by the processor, cause the computing device to:
display an image on an interface;
obtain data associated with an object, wherein the data comprises location data and shape data;
determine, based at least in part on the shape data, a type of the object;
determine, based at least in part on the location data, that the object is moving relative to a location of the computing device;
determine that the object is emitting a sound;
determine that the object is of interest based at least in part on the determining that the object is moving relative to the location of the computing device and the determining that the object is emitting the sound;
in response to the determining that the object is of interest, display a visual indicator, wherein the visual indicator is generated as an overlay on the image and the visual indicator represents the type of the object;
determine that the location data indicates that a location of the object is within a threshold relative to the location of the computing device; and
in response to the determining that the location data indicates that the location of the object is within the threshold relative to the location of the computing device, transition the display of the visual indicator into a view of the object within a selected portion of the image.

9. The computing device of claim 8, wherein the memory has further computer-executable instructions, which cause the computing device to:
obtain contextual information related to the object; and
determine at least one of a position and a size of the selected portion of the image based on, at least in part, the contextual information.

10. The computing device of claim 8, wherein the object comprises a human and the sound comprises speech.

11. The computing device of claim 8, wherein the data comprises movement pattern data and the memory has further computer-executable instructions, which cause the computing device to determine the type of the object based at least in part on the movement pattern data.

12. The computing device of claim 8, wherein the transitioning the display of the visual indicator into the display of the view of the object is based on, at least in part, the location of the object relative to the location of the computing device.

13. The computing device of claim 8, wherein the memory has further computer-executable instructions, which cause the computing device to modify a status of an application controlling the image based at least in part on the determining that the object is of interest.

14. The computing device of claim 13, wherein the modifying the status of the application includes at least one of reducing a volume control associated with the application or pausing one or more processes of the application.

15. A computer storage medium having computer-executable instructions stored thereupon which, when executed by a computing device, cause the computing device to:
display, at the computing device, an image on an interface;
obtain data associated with an object, wherein the data comprises location data and shape data;
determine, based at least in part on the shape data, a type of the object;
determine, based at least in part on the location data, that the object is moving relative to a location of the computing device;
determine that the object is emitting a sound;
determine that the object is of interest based at least in part on the determining that the object is moving relative to the location of the computing device and the determining that the object is emitting the sound; and
in response to the determining that the object is of interest, adjust a transparency value that controls a visual indicator that represents the type of the object and that provides a view of the object through the interface, wherein the view of the object through the interface is within a selected portion of the image.

16. The computer storage medium of claim 15, wherein the computer storage medium has further computer-executable instructions, which cause the computing device to:
obtain contextual information related to the object; and
determine at least one of a position and a size of the selected portion of the image based on, at least in part, the contextual information.

17. The computer storage medium of claim 15, wherein the object comprises a human and the sound comprises speech.

18. The computer storage medium of claim 15, wherein the computer storage medium has further computer-executable instructions, which cause the computing device to:
determine that the location data indicates that a location of the object is within a threshold relative to the location of the computing device;
in response to the determining that the location data indicates that the location of the object is within the threshold relative to the location of the computing device, display the visual indicator as an overlay on the image; and transition the display of the visual indicator into the view of the object through the interface.

19. The computer storage medium of claim 18, wherein the transitioning the display of the visual indicator into the view of the object through the interface is based on, at least in part, the location of the object relative to the location of the computing device.

20. The computer storage medium of claim 15, wherein the computer storage medium has further computer-executable instructions, which cause the computing device to modify a status of an application controlling the image based at least in part on the determination that the object is of interest.

* * * * *